United States Patent
Ivanov

(10) Patent No.: US 10,018,153 B2
(45) Date of Patent: Jul. 10, 2018

(54) VECTORED-THRUST PROPULSOR

(75) Inventor: Vladimir E. Ivanov, Moscow (RU)

(73) Assignees: Vladimir E. Ivanov, Moscow (RU); Filipp I. Nikonov, Khimki, Moscow region (RU)

( * ) Notice: Subject to any disclaimer, the term of this patent is extended or adjusted under 35 U.S.C. 154(b) by 1340 days.

(21) Appl. No.: 14/234,073

(22) PCT Filed: May 20, 2011

(86) PCT No.: PCT/RU2011/000347
§ 371 (c)(1),
(2), (4) Date: Jan. 21, 2014

(87) PCT Pub. No.: WO2011/155871
PCT Pub. Date: Dec. 15, 2011

(65) Prior Publication Data
US 2014/0223915 A1   Aug. 14, 2014

(51) Int. Cl.
*F02K 9/60* (2006.01)
*B63H 11/10* (2006.01)
*F02K 9/80* (2006.01)
*F02K 9/88* (2006.01)

(52) U.S. Cl.
CPC ............... *F02K 9/60* (2013.01); *B63H 11/10* (2013.01); *F02K 9/80* (2013.01); *F02K 9/88* (2013.01)

(58) Field of Classification Search
CPC ..... F02K 9/92; F02K 9/84; F02K 9/88; B63H 11/10
See application file for complete search history.

(56) References Cited

U.S. PATENT DOCUMENTS

| 3,599,899 A | 8/1971 | McCullough |
| 5,456,425 A | 10/1995 | Morris et al. |
| 2005/0072876 A1* | 4/2005 | Ducasse ............ B64C 15/12 244/23 D |

FOREIGN PATENT DOCUMENTS

| GB | 1389532 A | 4/1975 |
| RU | 2138766 C1 | 9/1999 |

OTHER PUBLICATIONS

PCT International Search Report and Opinion for PCT/RU 2011/000347 dated Nov. 24, 2011.

* cited by examiner

*Primary Examiner* — Janie Loeppke
(74) *Attorney, Agent, or Firm* — Patentagar PLLC; Alexander Rabinovich

(57) ABSTRACT

A jet propulsor, for use in vehicles or other devices moving in a three-dimensional gaseous or liquid medium such as air or water, has a joint chamber and at least four flow passages which are connected to the chamber with one of their ends, have independently controllable reversible pressure units inside, and are provided with independently controllable nozzles on their other ends. The propulsor pumps gas or liquid from the environment through itself and, because of reaction forces, provides for simultaneously and independently controlled thrust and thrust moment in terms of their value/strength and direction. Spatial control of the thrust vectoring and conditional thrust moment vector can be provided for in the spatial range of a full solid angle.

2 Claims, 4 Drawing Sheets

VECTORED-THRUST PROPULSOR

CROSS-REFERENCE TO RELATED APPLICATIONS

This application is a U.S. National phase continuation-in-part application of the International application PCT/RU2011/000347, filed May 20, 2011 claiming priority to Russian application 2010123344, filed Jun. 8, 2010, the entire content of the International and Russian applications being hereby incorporated in their entirety into the present application by reference.

BACKGROUND OF THE DISCLOSURE

1. Field of Technology

The present disclosure relates to propulsors and represents an apparatus for generating controllable thrust and thus for moving a vehicle or another object in a three-dimensional liquid (such as water) or gaseous (such as air) medium.

2. Description of Related Art

Similar apparatus well known in the art are, for example, hydro jet propulsors of various designs and configurations (see, for example, Kulikov C. V., Khramkin M. F. Hydro jet propulsors, the theory and design. L. Sudostroyeniye, 1980). Such propulsors are able, depending on their particular design, to provide for the control of both thrust vector, and of thrust moment (turning force) within one or other spatial angle range. However, no prior art propulsors have been known to provide for effective spatial control of the thrust vector and moment in a full solid angle range.

Also known in the art have been turbojet engines (engines-propulsion units) with deflecting nozzles (such as Rolls Royce Pegasus engine—Pegasus: The Heart of the Harrier, Andrew Dow, Pen & Sword, 2009, ISBN 978-184884-042-3) having several flow passages (channels) connected to a joint chamber (a turbojet engine compressor). However, pressure units in those engines (compressors, combustion chambers) fail to provide for the gas flow reversible control. Additionally, the Pegasus design fails to provide for the spatial control of the thrust vector and thrust moment in the full solid angle range.

There have also been known in the art a jet system for controlling vertical-takeoff-and-landing aircrafts comprising a plurality of propulsion nozzles spaced at a maximum possible distance from the aircraft center of mass and supplied with compressed air through ducts from a compressor of a vectored-thrust engine. The configuration of the system allows for controlling the nozzle thrust value and direction, thus making it possible to control the system overall thrust and thrust moment in the spatial angle range equal to a full solid angle close thereto. The prior art system, however, does not comprise duct reversal pressure units, which would be important to make the system work effectively as a propulsor rather than a control system.

SUMMARY OF THE DISCLOSURE

The object of the technical solution in the present disclosure is to provide an effective propulsor with sufficiently rapidly varying control and capable of creating both a thrust and a thrust moment (turn force), a vector of the thrust and a vector of the thrust moment being each value controlled, the direction of each of those vectors being controlled in a maximum wide angle range up to a full solid angle, no matter what the propulsor spatial orientation is. Thus, a propulsor providing enhanced maneuverability and effectiveness when moving in a three-dimensional gaseous or liquid medium can be realized.

With this object in mind, there is proposed a jet flow propulsor using gas or liquid from the environment the propulsor is in as a working fluid. The propulsor comprises a plurality of flow passages serving for the movement of the working fluid. The passages are interconnected through a joint flow chamber and equipped with controllable reversible pressure units and controllable nozzles. Each of the passages is connected by one end thereof to the joint flow chamber whereas another end of each of the passages is in fluid communication with the environment and includes a nozzle or is provided with same. The number of the flow passages can be four or more, each of the controllable reversible pressure units is adapted to be independently controlled, and the nozzles in the flow passages can be independently controllable and adapted to controllably deflect a working fluid exhaust jet, as well as to let the working fluid into the propulsor from the environment.

The propulsor according to the present disclosure can comprise eight flow passages, and the nozzles of those passages are made symmetric pairwise relative to a common plane of symmetry.

Other features and aspects of the disclosure will be apparent from the following description, drawings and claims.

DETAILED DESCRIPTION

Figure 1:
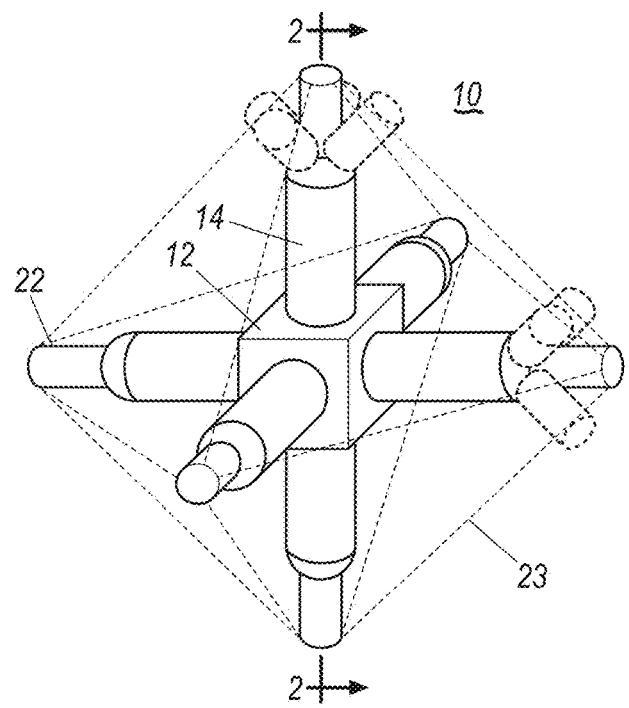
FIG. 1 shows a perspective view of an example of a structural layout in implementing the present design.

The following terms have been used throughout the description:

"Working fluid"—that portion of ambient gas or liquid which is accommodated within propulsor internal space; a jet force emerging upon ejecting the working fluid from the propulsor into outside environment is used for creating thrust and thrust moment.

"Joint (flow) chamber"—an enclosed volume, which all passaged are connected to with one end thereof; the passages are open into the chamber; technically, the chamber can include no proper, clearly expressed structural elements, but rather present a propulsor common internal space where the passages interconnect (intersect); accordingly, to be understood by "joint chamber" in this application is the above-mentioned common space at the place of the interconnection of the passages.

"Flow passage"—a structural volume designed for the working fluid movement within same outwardly from the joint chamber and inwardly from outside toward the joint chamber; there are pressure units in the passages; the propulsor flow passages can include no clearly expressed structural elements and no defined length and comprise only the pressure unit with a nozzle attached thereto.

"Pressure unit (pressure apparatus)"—an apparatus providing a controlled pressure head of the working fluid in a passage by value and direction and a two-way flow of the working fluid within the passage, both from the joint chamber outside and from the outside end of the passage toward the joint chamber; in each passage, the pressure apparatus can be independently controllable; a passage can comprise several pressure apparatuses acting in sync as a single pressure unit, in which case understood by a pressure unit (apparatus) is an aggregation thereof.

"Nozzle"—is represented here as either a mere open outside end of the propulsor flow passage or the end of the flow passage profiled and technically equipped one way or another or an apparatus placed on the passage outside end, which provides for shaping one or more jets of the working fluid and controlling the ejection of the jet (jets) in a predetermined direction; structurally, the nozzle can include a number of apparatuses interacting with each other such as a fixed nozzle and a separate deflecting apparatus diverting the jet that is being ejected, in which case understood by nozzle is the whole aggregation of the apparatuses; when working in a suction mode, i.e. where the working fluid moves from the outside end toward the joint chamber, the nozzles provide for the working fluid flow from the outside environment into the propulsor (i.e. not preventing such a flow from occurring).

"Propulsor power drives"—a technology aggregation providing for the energy input to propulsor actuators—pressure units, nozzles and other units—to secure their work; most commonly, it is the aggregation of engine packages and transmissions.

"Thrust moment conditional vector"—a mathematical (physical) concept, a vector, whose "length" characterizes the torque value, whereas its spatial direction characterizes the direction in which the aggregated torque is applied to the object (according to the right-hand rule).

"Propulsor overall effectiveness"—an overall aggregation of features and technical characteristics illustrating propulsor economic benefits; related thereto can be jointly provided thrust, speed, fuel effectiveness, maneuverability, reliability, operating convenience, safety, and a number of other parameters.

Figure 2:
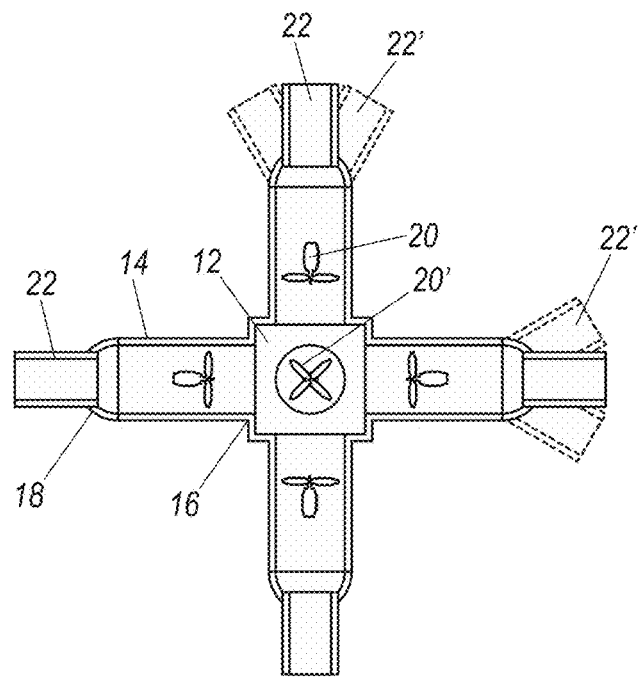
FIG. 2 illustrates a cross-section of the example in FIG. 1 along line 2-2.

Referring now to FIGS. 1, 2, 7, and 8, the claimed propulsor 10 of a vehicle (not shown) structurally comprises a joint (central) chamber 12 (see FIGS. 1 and 2), to which several (four (FIGS. 7 and 8) or more, such as six shown in FIGS. 1-2 in a non-limiting manner) flow passages 14 are connected. With one of its ends, 16, each of the passages 14 is in fluid communication with the central chamber 12, with another end, 18,—with a three-dimensional gaseous or liquid medium (i.e., with the ambient environment), which the vehicle is in. The movement of the working fluid (not shown) in the propulsor passages is realized by means of pressure units 20 located in each of the passages. For the definiteness and illustrative purposes, the pressure units 20 are depicted as propellers (reversible propellers are understood), the propeller 20' being located in the passage which is normal to the plane of the drawing. The pressure units 20 provide for a controlled pressure head and flowing of the working fluid inside the passages 14 in the direction both to and from the central chamber 12 of the propulsor. Reversibility of the pressure units including propellers can be achieved, for example, by the negative angling of the propeller blades. Controlling the pressure units can be accomplished by control units external in relation to the pressure units or by those making a part thereof. Nozzles 22 at the outside ends 18 of the passages 14 provide for direction-controlled exhaust of the working fluid. At least, some of the nozzles can be independently controlled. Also for illustrative purposes, the nozzles 22 are conditionally shown as devices deflecting the working fluid exhaust jet in the drawing plane only, though all the reasoning herein is equally valid for the case where the nozzles provide for the spatial deflection of the exhaust jet. Reference number 22' shows, as an illustrative, and not limiting, variant, the limits of the controlled nozzle jet deflection. Controlling the nozzles can be accomplished by control units external in relation to them or by those representing a structural part thereof. In each and every moment, the pattern of the working fluid movement through all the nozzles 22, passages 14, and central chamber 12 of the propulsor 10 results from the joint work of all propulsor pressure units 20 because there is a hydrodynamic communication between all the passages 14 via the central chamber 12.

Spatial configuration of the propulsor nozzles 22 can vary depending not only on particular structural features of the propulsor such as the number of the passages 14, but also on the intended application of the propulsor and demands of the vehicle with which the propulsor is to be used. With that in view, believed to be preferable, as far as the optimization of work is concerned, but not limiting, is a version where the nozzles are located at the tops of an imaginary centrally symmetric polytope 23 circumscribed about the propulsor, or configuration versions close to that.

The claimed propulsor works as follows: in the main operational regime, one or more passages 14 suck in gas or liquid from the ambient environment to use it as a working fluid, the pressure units 20 of those passages working for suction. Simultaneously, the pressure units 20 of the remaining passages 14 operate for ejecting the working fluid out to the ambient environment, the nozzles 22 of those remaining passages forming the direction of the ejection and the speed of ejecting jets from a nozzle depending not only on the operation of the pressure unit 20 of the respective passage 14 but also on the operation of the pressure units 20 of all other passages 14, both sucking and ejecting, since all the passages 14 are hydrodynamically interconnected via the central chamber 12. Upon ejecting working fluid jets, propulsive efforts emerge. The value of the propulsive effort is correlated with the speed of the jet and depends on the operation of the pressure units 20 of the passages 14. Propulsive effort moments (turning forces) are controlled by both nozzle jet deflection and pressure unit operation. Summarily, all the emerged propulsive efforts define the direction and value of the total propulsor thrust and the direction and strength of the total thrust moment (turning force).

By controlling the value and direction of pressure head of the pressure units 20 of the passages 14, provided that at any moment some of the passages 14 work for suction and some—for ejecting the working fluid, and by controlling the direction of ejecting jets using controlled nozzles 22, it is possible to arrive at any propulsor resultant thrust and resultant thrust moment in terms of the value/strength and spatial direction thereof (within the full solid angle), no matter what the spatial orientation of the propulsor proper is.

Shown in a simplified manner in sketches of FIGS. 3-6 are examples of operation of the propulsor 10 having configuration with six flow passages illustrated by FIG. 1. For illustrative purposes only, the passages in FIGS. 3-6 located normally to the drawing plane are understood as working for suction only in all propulsor regimes reviewed.

Figure 3:
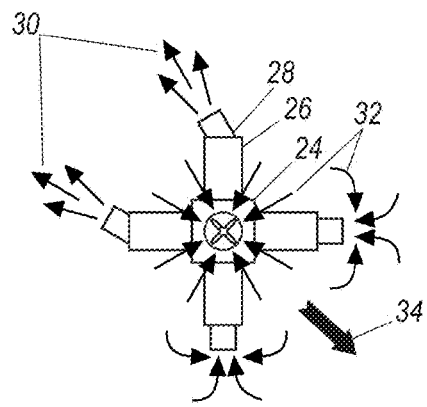
FIGS. 3-6 depict layouts elucidating examples of operation of the structure shown in FIG. 1.

FIG. 3 schematically shows the propulsor in the configuration illustrated by FIGS. 1 and 2. Reference 24 in FIG. 3 is the central chamber, reference 26 is one of the flow passages, and reference 28 designates one of the nozzles. Reference 30 in FIG. 3 belongs to arrows (also shown in subsequent FIGS. 4-6, though not designated) going from a passage, to thus show the direction of jets of the working fluid when being ejected from the propulsor. Upon the ejection of the jets, propelling forces develop providing for propulsor thrust and thrust moment. Curved and straight arrows 32 in FIG. 3 (as well as non-designated similar ones in subsequent FIGS. 4-6) directed into the passages illustrate sucking the working fluid into the propulsor from the outside environment that can be realized through the nozzles. Shown for illustrative purposes only is the embodiment where the propulsor center of mass coincides with the center of symmetry of the propulsor. Also for more clearness, the operation of the propulsor is described without a vehicle; the propulsor mounted in the vehicle works likewise.

In the example illustrated by FIG. 3, the propulsor ejects working fluid jets from the "top" (as conventionally referred to in the drawing and further in the text) and "left" passages 26 in the "up and left" direction and sucks working fluid from the outside environment through the "right" and "bottom" passages 26. The propelling forces emerging in this jet ejection create propulsor overall thrust in the "down and right" direction 34 as thrusts add up, and create no thrust moment since thrust moments of the two passages are cancelled by each other.

Figure 4:
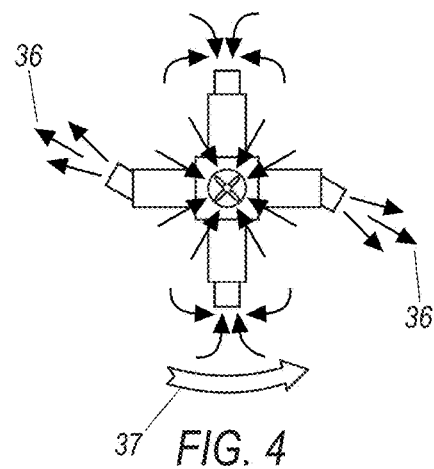

In the example illustrated by FIG. 4, sucking working fluid from the outside environment is performed through the "top" and "bottom" passages 26. The jets eject from the "left" and "right" passages 26 in the directions shown by arrows 36. In this way a "counterclockwise" thrust moment 37 of the propulsor and zero overall thrust are created since thrusts in such a mode are mutually balanced whereas thrust moments add up.

Figure 5:
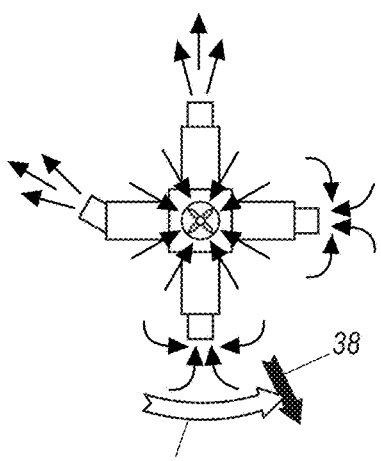

The operating mode of the propulsor illustrated by FIG. 5, where sucking is shown being performed through the "bottom" and "right" passages 26 and thrusts through the "top" and "left" passages 26, simultaneously provides the thrust in an approximate direction 38 of "down-down-right" due to adding up thrusts of the "top" and, in part, "left" passages 26, and a "counterclockwise" thrust moment 39 due to the "left" passage 26.

Figure 6:
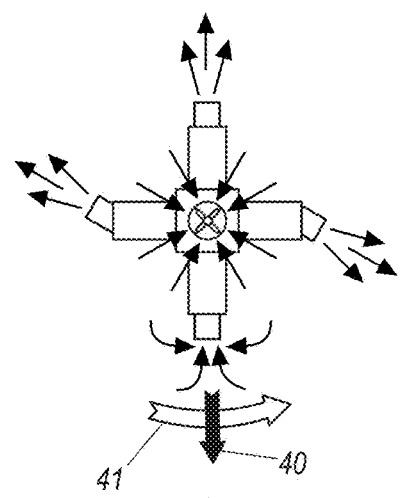

The propulsor operating mode according to FIG. 6 simultaneously provides thrust in the "down" direction 40 in the drawing, and thrust moment 41 in the "counterclockwise" direction. Here, the "down" thrust is created by the jet from the "top" passage 26 whereas thrusts from the "left" and "right" nozzles 28 cancel each other. The "counterclockwise" thrust moment 41 is provided by the nozzles 28 of the "left" and "right" passages 26. Sucking the working fluid is performed through the "bottom" passage 26.

Figure 7:
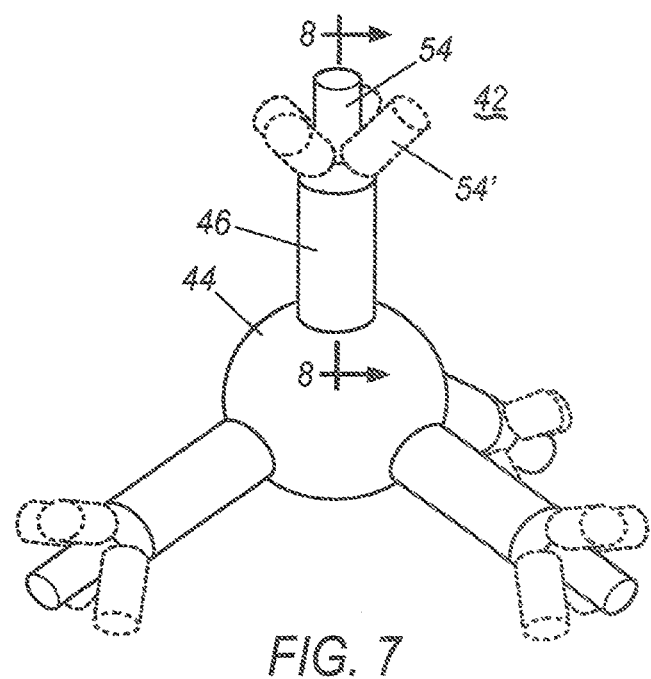
FIGS. 7 and 8 present the embodiment of the propulsor having four flow passages.
Figure 8:
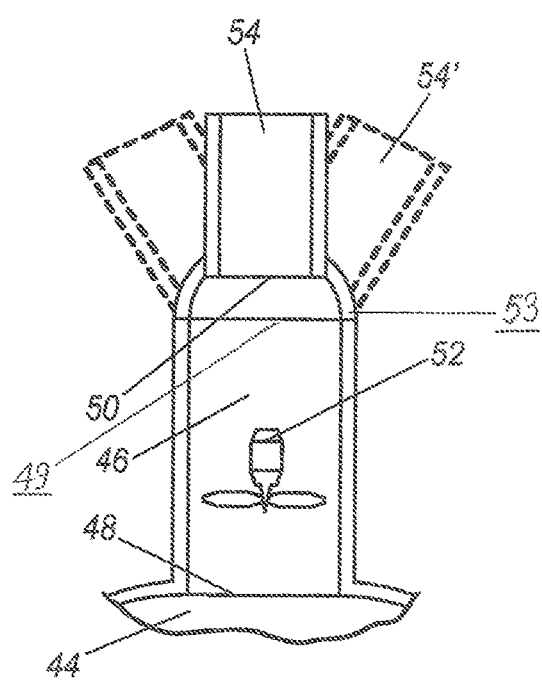
Figure 9:
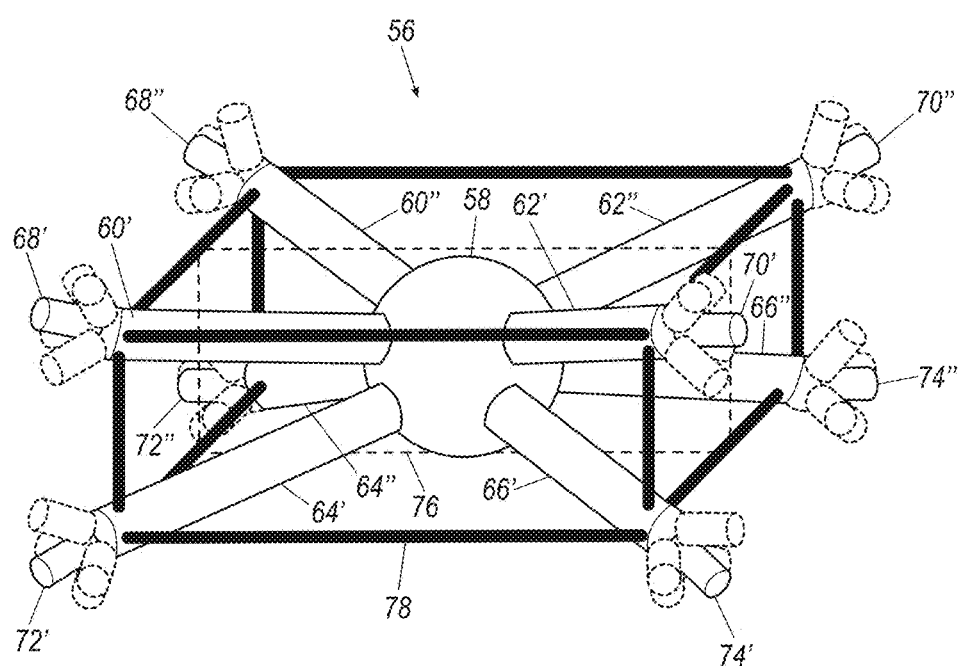
FIG. 9 illustrates the embodiment of the propulsor with eight flow passages.

FIGS. 7 and 8 illustrate a propulsor 42 that has a central chamber 44 and four flow passages 46. With one end, 48, the passages 46 are connected to the central chamber 44, whereas another end, 49, of each of the passages 46 is in fluid communication with a three-dimensional gaseous or liquid medium (i.e., with the ambient environment), which the vehicle is in. Responsible for the movement of the working fluid in the propulsor passages 46 are pressure units 52 provided in each of the passages. Shown as an example in FIG. 8a, a fixed nozzle 53 at the outside end 49 of the passages 46 comprises a separate deflecting apparatus 50 making for direction-controlled exhaust of the working fluid. Reference number 54 and number 54' show the deflecting apparatus 50 in its coaxial (with the passage 46) and tilted positions. Otherwise, the structure has no fundamental differences from that shown in FIGS. 1-6. Shown in FIG. 9 is one more embodiment of the propulsor according to the present disclosure. The propulsor 56 of this embodiment comprises a central chamber 58 with eight flow channels 60', 60", 62', 62", 64', 64", 66', and 66". Each of the flow channels has a reversible pressure unit (not shown) and is provided with a controllable nozzle at its outer end. The nozzles are assigned reference numbers 68', 68", 70', 70", 72', 72", 74', and 74". They are symmetric pairwise relative to a common plane 76 of symmetry that can be considered a diametrical plane of the propulsor 56. It can be, for example, a plane of symmetry in an aircraft or another vehicle, in which the proposed propulsor is supposed to be used. In FIG. 9, these symmetric pairs of nozzles are 68' and 68", 70' and 70", 72' and 72", as well as 74' and 74". A load frame 78 is shown in FIG. 9 for the better understanding of the spatial configuration of the propulsor components.

The structure of the disclosed propulsor gives rise to the following associations and limitations. Maximum of thrust and maximum of thrust moment depend on the structure of a particular propulsor and are limited by the power of power drives. The peak of thrust in propulsor is achieved at zero thrust moment, and the peak of thrust moment—at zero thrust as these parameters are provided for by same actuators—passage pressure units and nozzles—and use same energy source—propulsor power drives.

A structural spatial configuration of the flow passages and nozzles can vary as dictated by design features of a particular propulsor and depends, for example, on the number of the passages. Based on the propulsor described structural principles, a number of configurations can be proposed that assure thrust and thrust moment spatial control in the full solid angle range. Not limiting examples of some of such configurations were set forth in the description and shown in the drawings.

As discussed in the above, the propulsor according to the present disclosure makes it possible to perform controllable thrust and thrust moment (turn force) in any direction (in the full solid angle).

Summing up, the claimed jet propulsor provides controlling simultaneously the value and spatial direction of thrust in the range of the full solid angle and the strength and direction of a thrust moment conditional vector in the range of the full solid angle.

The claimed jet propulsor is intended for the use in means of transportation or other apparatuses moving in a three dimensional liquid or gaseous medium such as air or water, and provides for thrust and thrust moment. The propulsor provides controlling the value/strength and direction of both thrust and thrust moment simultaneously and independently, the spatial control of thrust vector and thrust moment conditional vector being provided in a spatial range of a full solid angle unaffected by the attitude of the propulsor itself. Such a propulsor when moving in a three dimensional liquid or gaseous medium offers an enhanced level of maneuverability along with high overall effectiveness.

The invention claimed is:

1. A jet propulsor using gas or liquid of outside environment, which the propulsor is in, as working fluid, the propulsor comprising:
at least eight flow passages, which a working fluid flow moves through;
a joint flow chamber, to which all the flow passages are connected with one of their ends, another end of each of the flow passages being in fluid communication with the outside environment;
an independently controllable reversible pressure unit located in each of the flow passages to control value and/or direction of a pressure head in the working fluid flow; and nozzles installed at said other ends of the flow passages, each of the nozzles being provided with an independently controllable deflecting apparatus effecting the deflection of an ejected jet of the working fluid, whereby thrust and thrust moment spatial control in the full solid angle range is secured, no matter what the propulsor spatial orientation is, to thereby provide enhanced maneuverability of the propulsor.

2. The jet propulsor as claimed in claim 1, wherein the nozzles are symmetric pairwise relative to a common plane of symmetry.

\* \* \* \* \*